(12) United States Patent
Schindler et al.

(10) Patent No.: US 11,124,040 B2
(45) Date of Patent: Sep. 21, 2021

(54) TORSION SPRING ARRANGEMENT FOR A WHEEL SUSPENSION ARRANGEMENT OF A MOTOR VEHICLE, AND WHEEL SUSPENSION ARRANGEMENT FOR A WHEEL OF AN AXLE OF A MOTOR VEHICLE

(71) Applicant: AUDI AG, Ingolstadt (DE)

(72) Inventors: Sebastian Schindler, Ingolstadt (DE); Mike Engel, Schlettau (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/768,249

(22) PCT Filed: Nov. 6, 2018

(86) PCT No.: PCT/EP2018/080363
§ 371 (c)(1),
(2) Date: May 29, 2020

(87) PCT Pub. No.: WO2019/105692
PCT Pub. Date: Jun. 6, 2019

(65) Prior Publication Data
US 2020/0298648 A1    Sep. 24, 2020

(30) Foreign Application Priority Data
Nov. 30, 2017 (DE) .................... 10 2017 221 587.9

(51) Int. Cl.
| | | |
|---|---|---|
| *B60G 21/055* | (2006.01) | |
| *B60G 11/18* | (2006.01) | |
| *B60G 17/02* | (2006.01) | |

(52) U.S. Cl.
CPC ........ *B60G 21/0551* (2013.01); *B60G 11/183* (2013.01); *B60G 17/025* (2013.01);
(Continued)

(58) Field of Classification Search
CPC .... B60G 11/44; B60G 17/025; B60G 21/055; B60G 2204/122; B60G 2204/424;
(Continued)

(56) References Cited

U.S. PATENT DOCUMENTS

| 4,540,197 A * | 9/1985 | Finn ................. B60G 11/181 |
| | | 267/25 |
| 2014/0232083 A1* | 8/2014 | Mohrlock ............ B60G 11/48 |
| | | 280/124.166 |

(Continued)

FOREIGN PATENT DOCUMENTS

| DE | 603468 C | 10/1934 |
| DE | 8703322 U1 | 5/1987 |

(Continued)

OTHER PUBLICATIONS

Examination Report dated Aug. 1, 2018 in corresponding German application No. 10 2017 221 587.9; 20 pages.
(Continued)

*Primary Examiner* — James A English
*Assistant Examiner* — Matthew D Lee
(74) *Attorney, Agent, or Firm* — Maier & Maier, PLLC

(57) ABSTRACT

A torsion spring assembly for a wheel suspension of a motor vehicle, including two torsion bars arranged coaxially one inside another and also a spring element, which is arranged axially-parallel to the two coaxial torsion bars, and can be mounted on the motor vehicle body via a bearing position, wherein the radial outer hollow-cylindrical torsion bar can be mounted on the motor vehicle body side and is connected in a rotationally-fixed manner to an output lever fastenable on a wheel guiding element and the radial inner torsion bar is connected in a rotationally-fixed manner to the outer torsion bar and is connected in a rotationally-fixed manner via a coupling to the spring element.

12 Claims, 5 Drawing Sheets

(52) U.S. Cl.
CPC .... *B60G 2202/135* (2013.01); *B60G 2202/42* (2013.01); *B60G 2204/122* (2013.01); *B60G 2206/42* (2013.01); *B60G 2500/30* (2013.01)

(58) Field of Classification Search
CPC ............ B60G 2500/22; B60G 2202/22; B60G 2202/32; B60G 2204/127; B60G 2206/427; B60G 2202/134; B60G 2202/135; B60G 2202/42; B60G 2202/13; B60G 17/033; B60G 17/023; B60G 17/0157; B60G 2206/012; B60G 2204/121; B62D 55/1083
See application file for complete search history.

(56) References Cited

U.S. PATENT DOCUMENTS

| | | | | |
|---|---|---|---|---|
| 2018/0072357 | A1* | 3/2018 | Schindler | B60G 11/44 |
| 2018/0370315 | A1* | 12/2018 | Higle | B60G 11/113 |

FOREIGN PATENT DOCUMENTS

| | | | | |
|---|---|---|---|---|
| DE | 3873705 | T2 | 3/1993 | |
| DE | 102010033002 | A1 | 2/2012 | |
| DE | 102012107205 | A1 | 2/2014 | |
| DE | 102013002713 | A1 | 8/2014 | |
| DE | 102013012755 | A1 | 2/2015 | |
| DE | 102014003222 | A1 * | 9/2015 | F16F 15/03 |
| DE | 102016216899 | A1 * | 11/2017 | B60G 11/183 |
| DE | 102016217698 | A | 3/2018 | |
| DE | 102016217698 | A1 * | 3/2018 | B62D 55/1083 |
| DE | 102019111611 | A1 * | 11/2020 | B60G 21/055 |
| EP | 0197850 | A1 | 10/1986 | |
| FR | 498718 | A | 1/1920 | |
| JP | 2005112098 | A | 4/2005 | |
| JP | 2008302731 | A | 12/2008 | |

OTHER PUBLICATIONS

International Search Report and Written Opinion dated Feb. 13, 2019 in corresponding application No. PCT/EP2018/080363; 21 pages.

English translation of International Preliminary Report on Patentability dated Jun. 2, 2020 in corresponding International Application No. PCT/EP2018/080363; 7 pages.

* cited by examiner

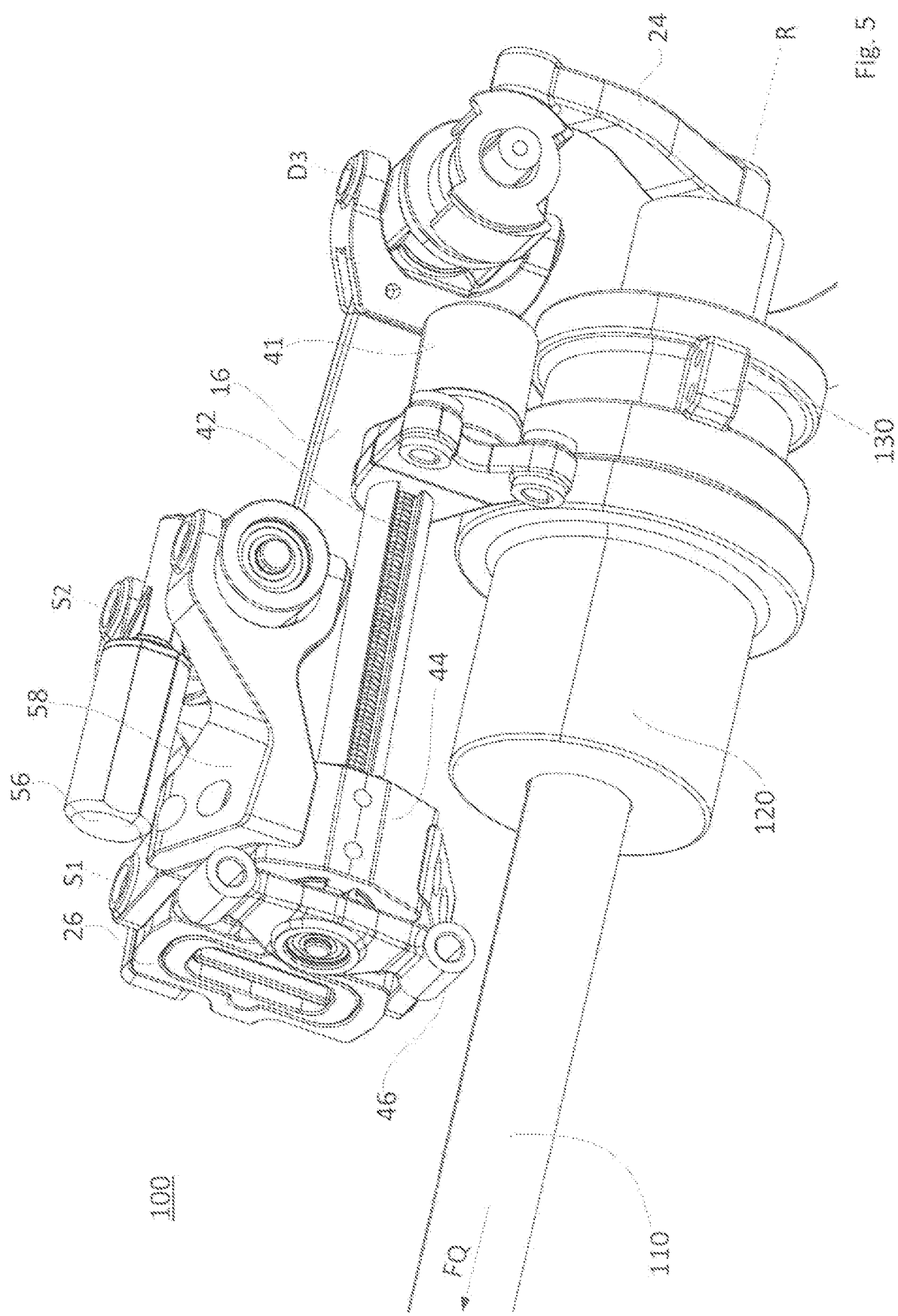

TORSION SPRING ARRANGEMENT FOR A WHEEL SUSPENSION ARRANGEMENT OF A MOTOR VEHICLE, AND WHEEL SUSPENSION ARRANGEMENT FOR A WHEEL OF AN AXLE OF A MOTOR VEHICLE

FIELD

The disclosure relates to a torsion spring assembly for a wheel suspension of a motor and a wheel suspension for a wheel of an axle of a motor vehicle.

BACKGROUND

A generic torsion spring assembly having two torsion bars arranged coaxially one inside another and also a spring element arranged in parallel to the two torsion bars, i.e., in the axial direction (a) of the torsion bars, which is operationally connected to the torsion bars and thus acts in series to the torsion bars with respect to the spring action, is disclosed in subsequently published DE 10 2016 217 698. The disclosed torsion spring assembly is distinguished in that a first actuator for displacing a spring base point and/or a second actuator for setting a torsion spring constant is associated with the spring element. According to the disclosure of DE 10 2016 217 698, a rotational movement is essentially applied to the spring element, i.e., the spring element is essentially loaded with torsion.

SUMMARY

The disclosure is based on the object of refining a torsion spring assembly for a wheel suspension of a motor vehicle in such a way that a construction reduced in cost and complexity is enabled.

In a known manner, the torsion spring assembly for a wheel suspension of a motor vehicle comprises two torsion bars arranged coaxially one inside another and also an additional spring element, which is aligned in the axial direction a of the torsion bars and is arranged axially-parallel with radial distance to the two coaxial torsion bars, and which is mountable via a bearing position on the motor vehicle body. The radially outer, hollow-cylindrical torsion bar, which is fixedly mountable via a bearing on the motor vehicle body, is connected here in a rotationally-fixed manner to an output lever fastenable on a wheel guiding element, and the radially inner torsion bar is connected in regions in a rotationally-fixed manner to the outer torsion bar and is connected in a rotationally-fixed manner via a coupling to the spring element, so that the spring element acts in series with the torsion bars with respect to the spring action. Furthermore, it is provided in a known manner that the bearing position mounting the spring element on the motor vehicle body side interacts with a first actuator for adjusting the effective spring length of the spring element and a second actuator for adjusting the spring pre-tension of the spring element.

According to the invention, it is proposed that the spring element be mounted via a spring element bearing on the coupling, which is designed in such a way that exclusively a translational deflection oriented in the tangential direction, i.e., perpendicular to the radial direction r and perpendicular to the axial direction a, is applied to the spring element, and that the bearing position mounting the spring element on the motor vehicle body side be formed as a plain bearing displaceable with respect to the spring element in the axial direction.

The spring element bearing arranged between spring element and coupling, which converts a rotational movement of the coupling resulting from a twist of the inner torsion bar into a tangentially oriented translational movement engaging on the spring element, has the effect that the spring element is exclusively stressed by bending and not—as in the prior art according to DE 10 2016 217 698—substantially by torsion.

This has the advantage that due to the exclusively translational deflection of the spring element, the spring element can now be embodied solely as a bending spring, and that due to the design of the bearing position mounting the spring element as a plain bearing displaceable in relation to the spring element in the axial direction, a simpler and thus complexity-reduced structure of the torsion spring assembly and thus also a more cost-effective construction of the torsion spring assembly is enabled. In particular, due to the formation of the spring element solely as a bending spring, which is now enabled according to the invention, and the formation of the bearing position as a plain bearing, it is ensured that the actuators can be embodied having simpler construction and thus more cost-effectively.

According to one particularly preferred embodiment, the two actuators are designed as spindle drives, which are constructively simple, thus cost-effective, and occupy little installation space.

For this purpose, the first spindle drive comprises a first motor activatable via a control unit, a first spindle, which is drivable via the first motor, aligned in the axial direction a, and arranged axially-parallel having radial distance to the spring element and the two coaxial torsion bars, and a first spindle nut. Spindle and spindle nut are engaged here with one another in a known manner via the spindle thread or nut thread thereof, respectively. While the first spindle is mountable so it is rotatable in relation to the motor vehicle body but is otherwise fixed, the first spindle nut is arranged so it is rotationally-fixed in relation to the first spindle but is axially movable. Moreover, the plain bearing is mounted on the first spindle nut, so that a rotational movement of the first spindle causes a linear movement of the first spindle nut in the axial direction a and thus a linear movement of the plain bearing mounted on the first spindle nut in relation to the spring element in the axial direction a, and thus an adjustment of the effective spring length of the spring element.

Correspondingly, the second spindle drive also comprises a motor driving a second spindle and also a second spindle nut, wherein the two spindles and the two spindle nuts are again engaged with one another via the spindle thread or nut thread thereof, respectively. The second spindle is aligned in this case essentially in parallel to the tangential, translational movement direction of the spring element bearing and is held axially spaced apart from the plain bearing via a holding element fastened on the first spindle nut. The second spindle is rotatably mounted in relation to the holding arm and is thus movably mounted—since the holding arm is fastened on the first spindle nut—in relation to the motor vehicle body and thus in relation to the spring element in the axial direction a. Correspondingly, the second spindle nut is mounted in a rotationally-fixed manner on a support arm fastened on the plain bearing. The plain bearing is in turn pivotably mounted on the first spindle nut around a first pivot axis S aligned perpendicularly to the first and second spindles, so that a rotational movement of the second spindle causes a linear movement of the support arm mounting the second spindle nut and thereby a pivot movement of the plain bearing around the first pivot axis S and thus a change of the pre-tension of the spring element.

To avoid stresses, it is provided according to one advantageous embodiment that the support arm is pivotably mounted on the second spindle nut around a second pivot axis $S_2$ aligned in parallel to the first pivot axis.

It is preferably provided that the first spindle is mounted so it is rotatable in relation to the motor vehicle body and fixed in the axial direction via a body-fixed mounted actuator housing.

A further preferred embodiment provides that the spring element is designed in the form of a leaf spring. In addition to low costs, the design of the spring element as a leaf spring also has the further advantage that the plain bearing mounting the leaf spring on the motor vehicle body side is to be implemented particularly easily and cost-effectively, for example, in the form of a clamping unit.

In one preferred technical implementation, the spring element bearing comprises a guide, which is aligned in parallel to the second spindle and is fixedly mounted on the motor vehicle body side, a bearing element which is displaceable, i.e., translationally guided on the guide, a first bearing part connected to the coupling and the bearing element, a second bearing part connected to the spring element and the bearing element, and means which convert the rotational coupling movement, i.e., a rotational movement of the coupling resulting from a pivot of the second torsion bar, into a translational movement of the bearing element and thereby of the second bearing part.

The means for converting the rotational coupling movement into a translational movement can be designed in different ways, for example, in the form of a rubber-metal bearing arranged between the guide and the first and/or the second bearing part. Alternatively, it is conceivable to design the means for converting the rotational coupling movement into a translational movement in the form of a pivotable mounting of the coupling on the bearing element, in that the coupling is pivotably mounted on the first bearing part around a first axis of rotation aligned in the axial direction, i.e., in parallel to the first spindle, and the first bearing part is pivotably mounted on the bearing element around a second axis of rotation lying in parallel to the first axis of rotation.

For the sake of completeness, it is also to be noted that the rotationally-fixed connection in regions of the inner torsion bar to the outer torsion bar is preferably formed at the end region of the inner torsion bar opposite to the coupling and, for example, in the form of a formfitting connection, in particular in the form of gear teeth, or in the form of a materially-bonded connection.

In addition, it is also to be noted that the motor-vehicle-side fixed mounting of the outer torsion bar takes place both directly, i.e., the torsion bar is mounted via a bearing directly on a vehicle body component, and also indirectly, i.e., the bearing mounting the torsion bar is fastened on a further component, which is in turn mounted fixed on the vehicle body.

The invention is furthermore based on the object of refining a wheel suspension for a wheel of an axle of a motor vehicle according to the type specified in the preamble of claim 8 in such a way that a construction which saves costs and installation space is enabled.

The wheel suspension according to the invention for a wheel of an axle of a motor vehicle is distinguished in that a suspension spring acting between the motor vehicle body and a wheel guiding element is designed in the form of a torsion spring assembly. Due to the design of the suspension spring in the form of the torsion spring assembly according to the invention, a construction which is compact viewed in the vehicle vertical direction and thus requires little installation space is advantageously enabled, which, due to the now enabled design of the spring element as a bending spring and also the enabled constructively simpler design of the actuators, is less complex and thus more cost-effective in comparison to the prior art according to DE 10 2016 217 698.

According to one particularly advantageous embodiment of the wheel suspension according to the invention, it furthermore comprises a stabilizer aligned in the vehicle transverse direction and designed in the form of a hollow-cylindrical torsion spring bar, wherein the torsion spring assembly is arranged in regions coaxially in the interior of the hollow-cylindrical torsion spring bar. That is, the torsion spring bar of the stabilizer and the two torsion bars of the torsion spring assembly are aligned in the vehicle transverse direction and have a shared axis of rotation R due to the coaxially nested arrangement. Due to the coaxially nested arrangement, an arrangement of the suspension spring which particularly saves installation space is advantageously enabled.

A further advantageous embodiment of the wheel suspension according to the invention provides that, in the region of the coaxial nesting of stabilizer and suspension spring, i.e., in the region of the coaxially nested arrangement of the components torsion spring bar and torsion spring assembly, a housing fixedly mounted on the motor vehicle body side is provided, by which the components are enclosed in this region. Both the stabilizer bearing mounting the torsion spring bar of the stabilizer and also the bearing mounting the outer torsion bar of the torsion spring assembly are mounted on the housing fixedly mounted on the motor vehicle body side. That is, the torsion spring bar and the outer torsion bar are in turn fixedly mounted indirectly on the vehicle body side via the housing fixedly mounted on the motor vehicle body side. In addition, the actuator housing mounting the first spindle fixedly on the vehicle body is moreover also attached to the housing and thus indirectly mounted on the vehicle body side via the housing.

Further advantages and possible applications of the present invention result from the following description in conjunction with the exemplary embodiment illustrated in the drawing.

BRIEF DESCRIPTION OF THE DRAWINGS

In the figures:

FIG. 5 shows a view from below of the wheel suspension according to FIG. 2.

DETAILED DESCRIPTION

Figure 1:
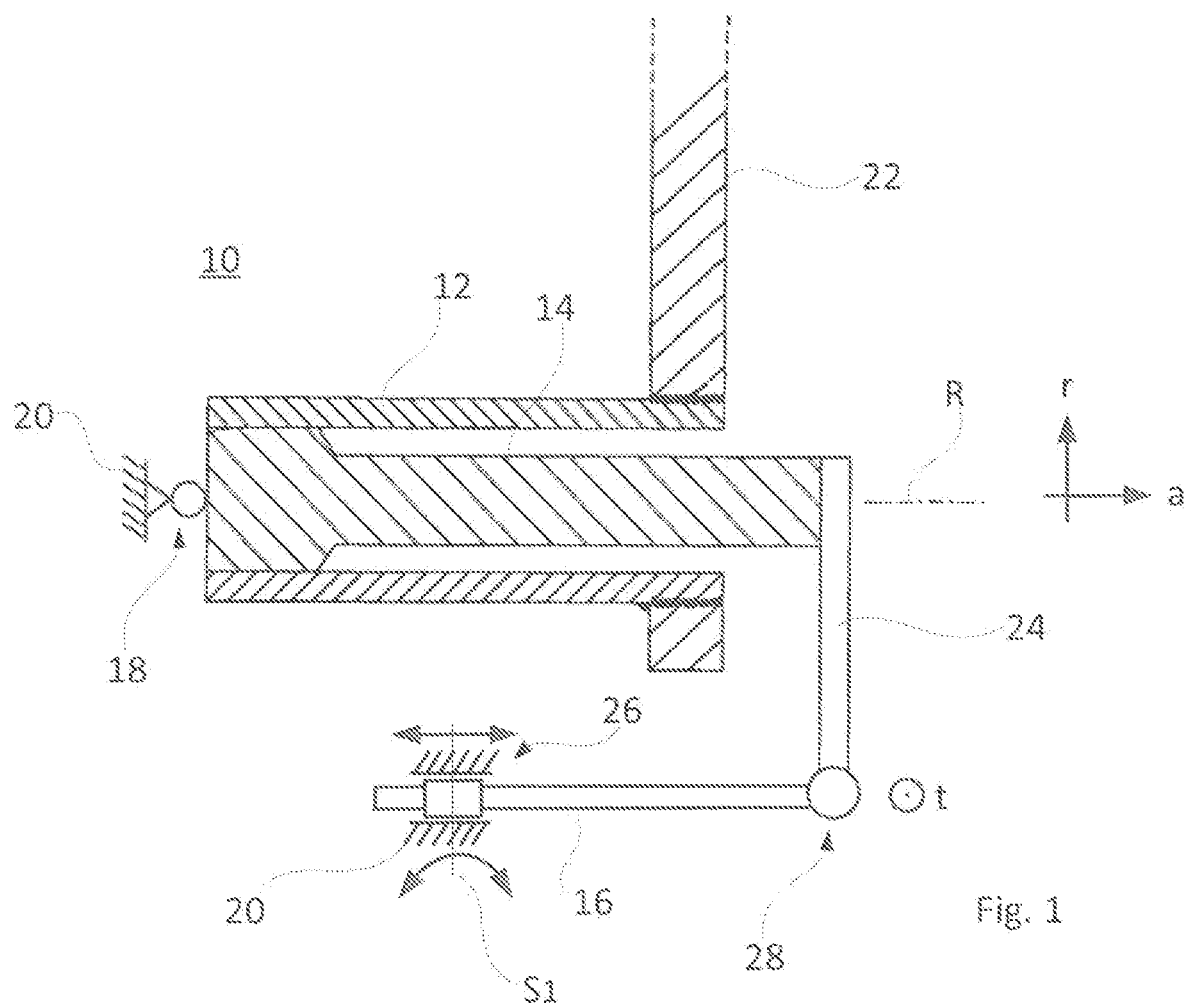
FIG. 1 shows a schematic sectional illustration of the torsion spring assembly according to the invention.

FIG. 1 shows a schematic sectional illustration of a torsion spring assembly, identified as a whole with the reference signs 10, for a wheel suspension of a motor vehicle.

The torsion spring assembly 10 comprises an outer torsion bar 12 viewed in the radial direction r, an inner torsion bar 14 arranged coaxially inside the outer torsion bar 12, and a spring element 16, which is designed in the form of a leaf spring and is arranged axially-parallel having radial distance to the two torsion bars 12, 14. In this case, as shown in FIG. 1, the outer torsion bar 12 is fixedly mounted via a bearing 18 on the motor vehicle body 20 and is connected in a rotationally-fixed manner to an output lever 22 fastenable on a wheel guiding element.

The shared axis of rotation of the two torsion bars 12, 14, which is aligned in the axial direction a, is identified by R hereafter.

The spring element 16 is connected to the inner torsion bar 14 via a coupling 24 and is mounted at its end facing away from the coupling 24 via a bearing position 26 on the motor vehicle body 20 and via a spring element bearing 28 on the coupling 24. The inner torsion bar 14 is fixedly connected to the outer torsion bar 12 at its end region facing away from the coupling 24, so that the torsion bars 12, 14 and the spring element 16 form a series circuit with respect to the spring action, i.e., the spring element 16 acts in series in relation to the two torsion bars 12, 14 with respect to the spring action.

The spring element bearing 28 is designed here in such a way that a rotational movement of the coupling 24 resulting from a pivot of the inner torsion bar 14 around the axis R is converted into a translational movement engaging on the spring element 16 and oriented in the tangential direction. The translational deflection of the spring bar 16 extending perpendicularly to the figure sheet in FIG. 1 is identified by the reference sign t. Due to the solely translational deflection of the spring bar 16, it is thus ensured that the spring element 16 designed in the form of a leaf spring is exclusively stressed by bending.

The bearing position 26 is designed in the present case as a plain bearing, which is displaceable by means of a first actuator in the axial direction a in relation to the spring element 16 to adjust the effective spring length of the spring element 16, and is pivotable by means of a second actuator around the axis $S_1$ shown to adjust the spring pre-tension of the spring element 16.

Figure 2:
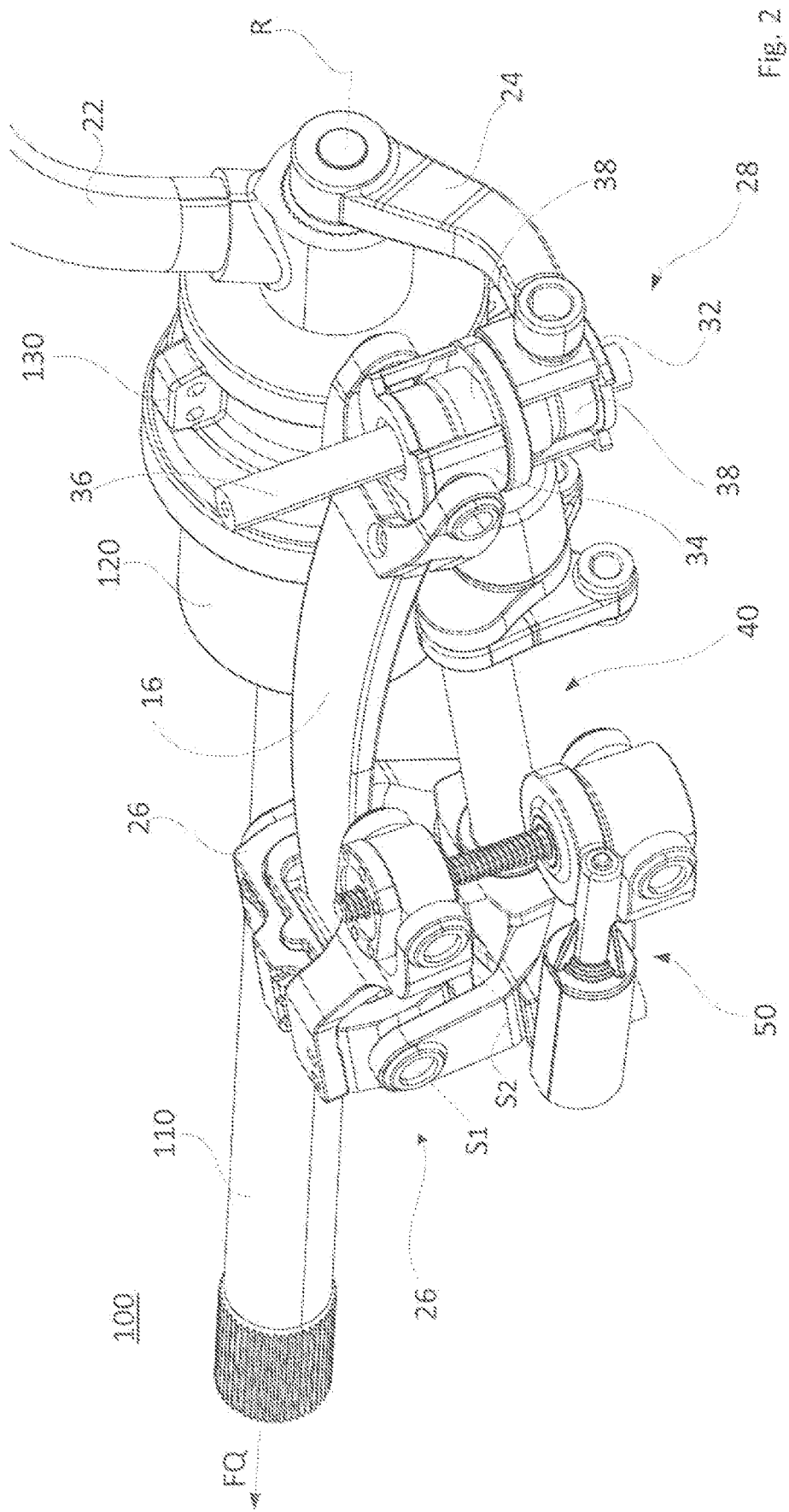
FIG. 2 shows a portion of a wheel suspension of a motor vehicle having a suspension spring designed as a torsion spring bar assembly according to FIG. 1.

FIG. 2 shows a portion of a wheel suspension identified as a whole by the reference sign 100, in which the suspension spring is formed by a torsion spring assembly 10.

The wheel suspension 100 comprises a stabilizer aligned in the vehicle transverse direction FQ and designed in the form of a hollow-cylindrical torsion bar 110, which—like the outer torsion bar 12 of the torsion spring assembly 10—is connected in a rotationally-fixed manner to the output lever 22. The output lever 22 is fastenable in a known manner with a wheel guiding element, for example, a suspension arm.

Figure 3:
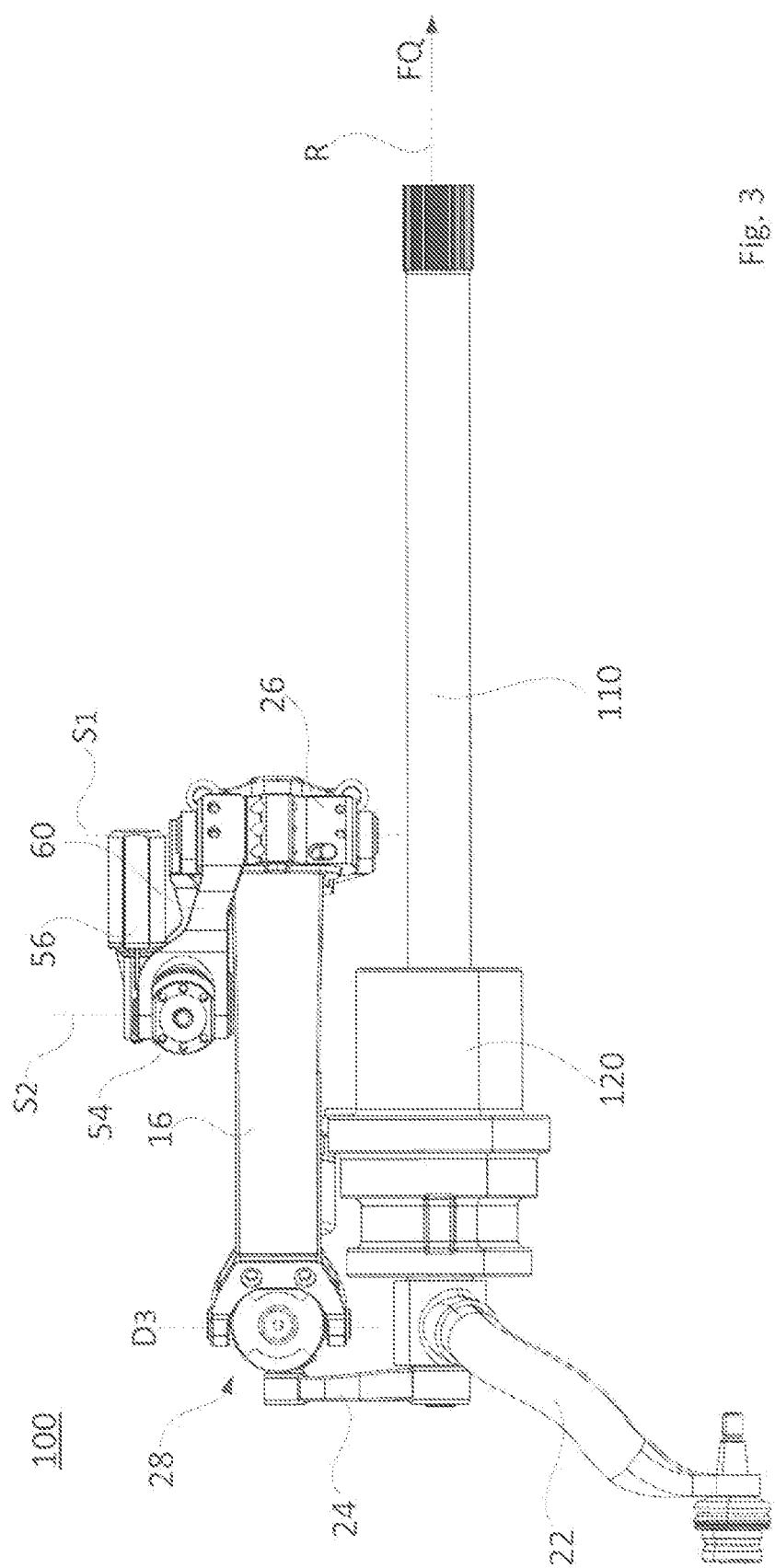
FIG. 3 shows a top view of the wheel suspension according to FIG. 2.
Figure 4:
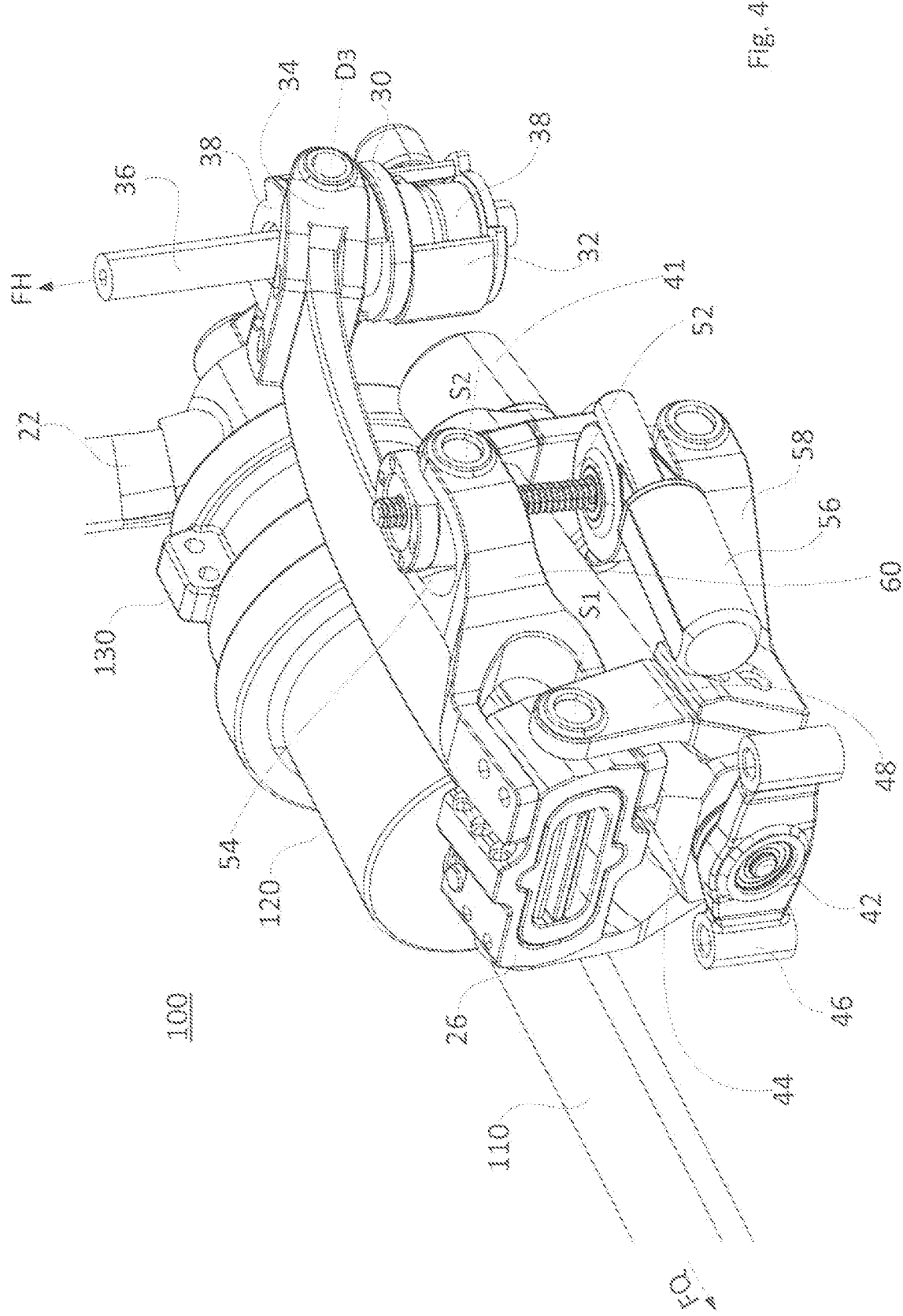
FIG. 4 shows a view diagonally from the front of the wheel suspension according to FIG. 2.

As FIGS. 2 to 4 furthermore show, in this case the torsion bar 110 of the stabilizer is enclosed in regions by a housing 120. The housing 120 can be fixedly mounted via a bearing position 130 on the motor vehicle body. The torsion bar 110 is mounted on the vehicle body side via a stabilizer bearing arranged in the housing 120.

Of the torsion bar spring assembly 10, in the present case only the coupling 24, the spring element bearing 28, the spring element 16 designed in the form of a leaf spring, and the bearing position 26, which mounts the spring element 16 on the motor vehicle body side and is designed as a plain bearing, are visible; the two torsion bars 12, 14 of the torsion assembly 10, which are arranged coaxially in the interior of the torsion bar 110 of the stabilizer, are concealed by the housing 120 in the present case.

As is apparent in particular from FIG. 2 and FIG. 4, the spring element bearing 28 comprises three bearing components, namely a bearing element 30, a first bearing part 32 connected to the coupling 24 and the bearing element 30, and a second bearing part 34 connected to the spring element 16 and the bearing element 30, wherein the bearing element 30 is translationally guided in the motor vehicle vertical direction FH via a guide 36, which is fixedly mounted on the motor vehicle body side and is aligned in the motor vehicle vertical direction. In order to ensure stress-free adjustment, the spring element 16 is moreover pivotably mounted on the second bearing part 34 around an axis of rotation $D_3$, which is aligned perpendicularly to the two torsion bars 12, 14 and perpendicularly to the guide 36 and thus in the present case perpendicularly to the motor vehicle vertical direction FH.

To convert the rotational movement of the coupling 24 oriented around the axis R into a tangential direction t, i.e., in the present case into a translational movement of the second bearing part 34 aligned in the vehicle vertical direction FH and thus of the end of the spring element 16 mounted in the bearing 28, rubber-metal bearings 38 are arranged between the guide 36 and the first and second bearing part 32, 36.

The actuators, which interact with the plain bearing 26, for adjusting the spring length of the spring element 16 and/or for adjusting the spring pre-tension of the spring element 16, are designed in the present case as spindle drives.

The adjustment of the spring length of the spring element is performed via the first spindle drive 40, cf. in particular FIG. 4 and FIG. 5. The first spindle drive 40 comprises a motor 41 activatable via a control unit, a first spindle 42 arranged axially parallel to the spring element and comprising a spindle thread, and a first spindle nut 44, which is engaged with the first spindle and comprises a nut thread. The first spindle 42 is mounted so it is rotatable but otherwise fixed via an actuator housing 46, which can be mounted fixed on the vehicle body. The first spindle nut 44 is mounted in a rotationally-fixed but axially-movable manner in relation to the first spindle 42. As is apparent from FIG. 4 in particular, in this case the plain bearing 26 is fastened via a bracket 48 on the first spindle nut 44, so that a rotational movement of the first spindle 42 causes a linear movement of the spindle nut 44 and thus of the plain bearing 26 fastened via the bracket 48 on the first spindle nut 44 in relation to the spring element 26.

The adjustment of the spring pre-tension of the spring element 16 is performed via a second spindle drive 50, cf. in particular FIGS. 3 to 5. The second spindle drive 50 comprises a second spindle 52 and a second spindle nut 54, which are engaged via the spindle thread or nut thread thereof, respectively.

The drive of the second spindle 52 is again performed via a second motor 56, which is activatable via a control unit. The second spindle 52 is aligned in parallel to the translational deflection of the spring bar 16, i.e., in the present case in the vehicle vertical direction FH. As is apparent from FIG. 5, in this case the second spindle 52 is held axially spaced apart from the plain bearing 26 via a holding arm 58 fastened on the first spindle nut 44. The second spindle 52 is rotatably mounted in relation to the holding arm 58 and therefore—since the holding arm 58 is fastened on the first spindle nut 44—is displaceably mounted in relation to the motor vehicle body and thus in relation to the spring element 16 in the axial direction a. As is apparent from FIG. 4 in particular, the spindle nut 54 is mounted in a rotationally-fixed manner on a support arm 60 fastened on the plain bearing 26. The plain bearing 26 is pivotably mounted here on the bracket 48 around the first pivot axis $S_1$ aligned perpendicularly to the first spindle 42 and perpendicularly to the second spindle 52, so that a rotational movement of the second spindle 52 causes a linear movement of the support arm 60 mounting the second spindle nut 54 in the vehicle vertical direction FH and thereby a pivot movement of the plain bearing around the pivot axis S and thereby a change of the spring pretension.

To avoid tensions, the support arm 60 is moreover pivotably mounted on the second spindle nut 54 around a second pivot axis $S_2$ aligned in parallel to the first pivot axis $S_1$.

The invention claimed is:

1. A torsion spring assembly for a wheel suspension of a motor vehicle, comprising:

two torsion bars arranged coaxially one inside another and also a spring element, which is arranged with radial distance to the two coaxial torsion bars, is aligned in an axial direction of the torsion bars, and can be mounted on a motor vehicle body via a bearing position, wherein an outer hollow-cylindrical torsion bar viewed in a radial direction can be mounted on a side of the motor vehicle body and is connected in a rotationally-fixed manner to an output lever fastenable on a wheel guiding element and the inner torsion bar viewed in the radial direction (r) is connected in a rotationally-fixed manner to the outer torsion bar and in a rotationally-fixed manner to the spring element via a coupling; and wherein the bearing position mounting the spring element on the motor vehicle body side interacts with a first actuator for effective spring length adjustment of the spring element and a second actuator for the pretension adjustment of the spring element, wherein the spring element is mounted via a spring element bearing on the coupling, which is designed in such a way that a translational deflection, exclusively oriented in the tangential direction (t), is applied to the spring element, and in that the bearing position mounting the spring element on the motor vehicle body side is designed as a plain bearing displaceable in relation to the spring element in the axial direction (a).

2. The torsion spring assembly as claimed in claim 1, wherein the first and second actuators are designed as spindle drives.

3. The torsion spring assembly as claimed in claim 1, wherein a first spindle drive comprises a first motor activatable via a control unit, a first spindle, which is drivable via the first motor, comprises a spindle thread, is aligned in the axial direction (a), and is arranged axially parallel with radial distance to the spring element and the two coaxial torsion bars, and also a first spindle nut, which is engaged with the first spindle and comprises a nut thread, wherein the first spindle can be rotatably mounted in relation to the motor vehicle body and the first spindle nut is arranged in a rotationally-fixed but axially-movable manner in relation to the first spindle, and wherein the plain bearing is mounted on the first spindle nut so that a rotational movement of the first spindle causes a linear movement of the first spindle nut in the axial direction (a) and thus a linear movement of the plain bearing mounted on the first spindle nut in relation to the spring element in the axial direction (a).

4. The torsion spring assembly as claimed in claim 3, wherein a second spindle drive comprises a second motor activatable via a control unit, a second spindle, which is drivable via the second motor, comprises a spindle thread, and is aligned in parallel to a tangential translational movement direction of the spring element bearing, and also a second spindle nut, which is engaged with the second spindle and comprises a nut thread, wherein the second spindle is held axially spaced apart from the plain bearing via a holding arm fastened on the first spindle nut and the second spindle is rotatably mounted in relation to the holding arm, and wherein the second spindle nut is mounted rotationally-fixed on a support arm fastened on the plain bearing, and the plain bearing is mounted pivotably on the first spindle nut around a pivot axis ($S_1$) aligned perpendicularly to the first and second spindle, so that a rotational movement of the second spindle causes a linear movement of the support arm mounting the second spindle nut and thus a pivot movement of the plain bearing around the pivot axis ($S_1$).

5. The torsion spring assembly as claimed in claim 4, wherein the support arm is mounted pivotably on the second spindle nut around a second pivot axis ($S_2$) aligned in parallel to the first pivot axis ($S_1$).

6. The torsion spring assembly as claimed in claim 3, wherein the first spindle is rotatably mounted in relation to the motor vehicle body via an actuator fixedly mounted on the vehicle body.

7. The torsion spring assembly as claimed in claim 1, wherein the spring element is designed as a leaf spring.

8. The torsion spring assembly as claimed in claim 2, wherein a first spindle drive comprises a first motor activatable via a control unit, a first spindle, which is drivable via the first motor, comprises a spindle thread, is aligned in the axial direction (a), and is arranged axially parallel with radial distance to the spring element and the two coaxial torsion bars, and also a first spindle nut, which is engaged with the first spindle and comprises a nut thread, wherein the first spindle can be rotatably mounted in relation to the motor vehicle body and the first spindle nut is arranged in a rotationally-fixed but axially-movable manner in relation to the first spindle, and wherein the plain bearing is mounted on the first spindle nut so that a rotational movement of the first spindle causes a linear movement of the first spindle nut in the axial direction (a) and thus a linear movement of the plain bearing mounted on the first spindle nut in relation to the spring element in the axial direction (a).

9. The torsion spring assembly as claimed in claim 8, wherein a second spindle drive comprises a second motor activatable via a control unit, a second spindle, which is drivable via the second motor, comprises a spindle thread, and is aligned in parallel to a tangential translational movement direction of the spring element bearing, and also a second spindle nut, which is engaged with the second spindle and comprises a nut thread, wherein the second spindle is held axially spaced apart from the plain bearing via a holding arm fastened on the first spindle nut and the second spindle is rotatably mounted in relation to the holding arm, and wherein the second spindle nut is mounted rotationally-fixed on a support arm fastened on the plain bearing, and the plain bearing is mounted pivotably on the first spindle nut around a pivot axis ($S_1$) aligned perpendicularly to the first and second spindle, so that a rotational movement of the second spindle causes a linear movement of the support arm mounting the second spindle nut and thus a pivot movement of the plain bearing around the pivot axis ($S_1$).

10. The torsion spring assembly as claimed in claim 9, wherein a support arm is mounted pivotably on the second spindle nut around a second pivot axis ($S_2$) aligned in parallel to the first pivot axis ($S_1$).

11. The torsion spring assembly as claimed in claim 10, wherein the support arm is mounted pivotably on the second spindle nut around a second pivot axis ($S_2$) aligned in parallel to the first pivot axis ($S_1$).

12. The torsion spring assembly as claimed in claim 8, wherein the first spindle is rotatably mounted in relation to the motor vehicle body via an actuator fixedly mounted on the vehicle body.

* * * * *